P. P. L. JAUGEY.
CARBURETER.
APPLICATION FILED DEC. 6, 1910.
1,078,582.
Patented Nov. 11, 1913.
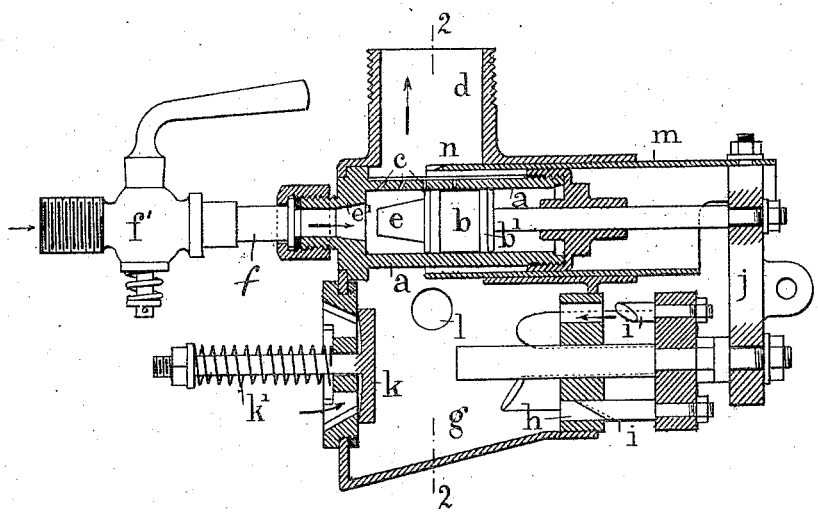
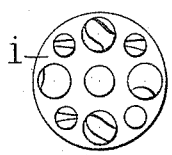
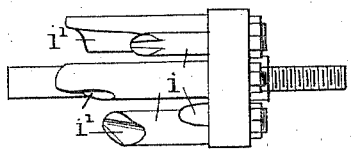
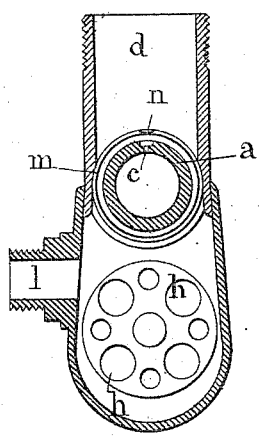
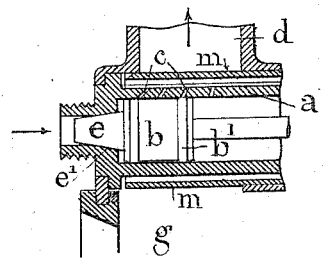
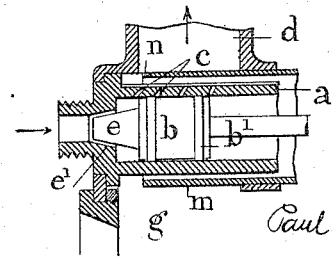
INVENTOR
Paul Pierre Louis Jaugey
By Howson and Howson
his ATTORNEYS
WITNESSES
L. H. Grote
W. E. Keir

UNITED STATES PATENT OFFICE.

PAUL PIERRE LOUIS JAUGEY, OF PARIS, FRANCE.

CARBURETER.

1,078,582.  Specification of Letters Patent.  Patented Nov. 11, 1913.

Application filed December 6, 1910. Serial No. 595,953.

*To all whom it may concern:*

Be it known that I, PAUL PIERRE LOUIS JAUGEY, a citizen of the Republic of France, and a resident of 27 Rue St. Didier, Paris, France, have invented new and useful Improvements in Carbureters, of which the following is a specification.

The object of the present invention is to provide a carbureter in which the usual float valve feed is dispensed with and the speed of the motor regulated by controlling the supply of carbureting liquid to the carbureter.

In certain types of motors, particularly those used in aeroplanes, it is highly disadvantageous to use a carbureter in which the supply of carbureting liquid (hereafter referred to as petrol, for the sake of brevity) is controlled by a float valve, inasmuch as the float chamber is constantly being tilted to different angles. No constant level in the float chamber (which is the object of the float valve arrangement) can be maintained under these conditions and irregularities in the feed to the carbureter result with the consequence that the engine is unevenly fed and may even stop, with disastrous results to the aviator.

In the present carbureter, the float valve feed is replaced by a needle valve or the like which controls the admission of petrol to the atomizing device without obstructing the atomizing orifices. The present arrangement is such that when it is desired to accelerate the motor, the supply of petrol is momentarily diminished automatically by the very act which results the following moment in reëstablishing the usual feed of petrol slightly in excess of the theoretically perfect amount, in order to render certain the operation of the motor. The temporary diminution of the petrol supply results in the establishment of a theoretically perfect feed for the moment, with the result that the motor is instantly accelerated while the subsequent increased feed of petrol is accompanied by a suitably augmented supply of air to maintain the motor at its accelerated speed.

An exemplary embodiment of my invention is shown in the accompanying drawings in which, Figure 1 is a longitudinal vertical section showing the position of the parts at the moment the speed of the motor is accelerated; Fig. 2 is a section on the line 2—2, Fig. 1; Figs. 3 and 4 are vertical sections through the admission port of the petrol, showing the latter respectively closed and open for the slowest speed for the motor; Figs. 5 and 6 are respectively side and end views of the air valve $i$.

In the embodiment of my invention here shown, my improved carbureter comprises an oil spraying cylinder $a$ in which works a piston valve $b$ with packing rings $b^1$. Atomizing orifices $c$ in the upper wall of the here horizontally placed cylinder, establish communication between the interior of the cylinder and the outlet or suction pipe $d$ leading to the motor. The end of the piston $b$ is coned to form a needle valve $e$, the coned seat $e^1$ for which is formed in the end of the cylinder which communicates with the petrol supply pipe $f$. The latter is connected with any suitable storage tank (not shown) and is provided with a cock $f^1$ by means of which the supply of petrol to the carbureter, may be admitted or cut off.

Beneath the atomizing cylinder $a$ is arranged an air box $g$ in one end of which a series of apertures $h$ are formed for the admission of air. These apertures may be of different sizes as shown and in any event are controlled by a multi-plunger valve connected by a stirrup $j$ with the rod of the piston $b$. The plunger rods $i$ of this valve correspond in diameter to their respective apertures $h$ and are of different lengths, each having its end formed on the bias and its end face grooved as at $i^1$ so that each aperture $h$ is closed or opened gradually as the plunger is moved in or out. A second air inlet to the chamber $g$ is closed by the valve $k$ pressed to its seat by the spring $k^1$. A hub $l$ may also be provided on the air box to receive a connection from the exhaust pipe so that, if needed, the exhaust gases may be led to the carbureter to raise the temperature of the explosive mixture.

The outlet through the pipe $d$ to the motor is controlled by a sleeve $m$ concentric with the cylinder $a$ and working in the socket $m^1$. This sleeve $m$ is connected to the stirrup $j$ and thus moves with the valve $b$ and air valve $i$, so that the outlet to the suction pipe $d$ is opened or closed in harmony with the augmentation or decrease in the supply of explosive mixture. A notch $n$ in the forward edge of the sleeve $m$ affords a sufficient aperture for the admission of the mixture to the pipe *d* when the engine is running at its lowest speed.

The operation of the carbureter is readily understood. In the position shown in Fig. 3 the motor is stopped, the sleeve *m* completely closes the pipe *d*, the needle-valve *e* is seated so that the supply of petrol is cut off and the air supply openings *h* are closed by the plungers *i*. In the position shown in Fig. 4, when the motor is working at its lowest speed, only a single atomizer orifice *c* in the cylinder *a* is uncovered by the piston *b*, the needle valve *e* is slightly opened, the shortest rod *i* partially opens one of the air ports *h* and the explosive mixture escapes to the pipe *d* through the notch *n* in the sleeve *m*.

In view of the distance between the orifices *c* in the cylinder *m* it is possible to increase the amount of air admitted at *h* without increasing the supply of petrol, and vice versa, by moving the stirrup *j* slightly in one direction or the other, for example, by a hand lever not shown. This movement augments or reduces the amount of petrol admitted to the cylinder *m* by the valve *e*, without throttling the spray aperture *c*.

I claim as my invention—

1. In a carbureter, an oil feed cylinder with lateral spray outlets in combination with a piston valve working in said feed cylinder and serving upon the sudden opening of the outlets to create a temporary depression in said feed cylinder whereby the escape of oil therefrom is temporarily diminished, together with a needle valve moving with said piston and controlling the admission of petrol to the feed cylinder, for the purpose described.

2. In a carbureter, an oil feed cylinder with lateral spray outlets in combination with a piston valve working in said feed cylinder and serving upon the sudden opening of the outlets to create a temporary depression in said feed cylinder whereby the escape of oil therefrom is temporarily diminished, together with a needle valve moving with said piston and controlling the admission of petrol to the feed cylinder, the spray apertures in the feed cylinder being spaced longitudinally apart sufficient distance to permit the control of the flow of petrol to the cylinder by the longitudinal movement of the piston and needle valve when running at low speed, without uncovering additional spray apertures, substantially as described.

3. A carbureter having a feed cylinder with longitudinally arranged spray apertures, a piston valve controlling the latter, an inlet aperture opening to the feed cylinder, and a needle valve moving with the piston to control the admission of oil through said aperture to the cylinder, in combination with an air inlet and a valve moving with said piston to control the air supply, the spray apertures in said feed cylinder being spaced apart sufficient distance to permit the flow of petrol to the feed cylinder and the admission of air to the carbureter to be increased or diminished without opening additional spray apertures or throttling those open while running at low speed, substantially as described.

In testimony whereof I have signed my name to this specification, in the presence of two subscribing witnesses.

PAUL PIERRE LOUIS JAUGEY.

Witnesses:
 JACQUES LIJEUNE,
 LÉON PEILLET.